(No Model.)
2 Sheets—Sheet 2.

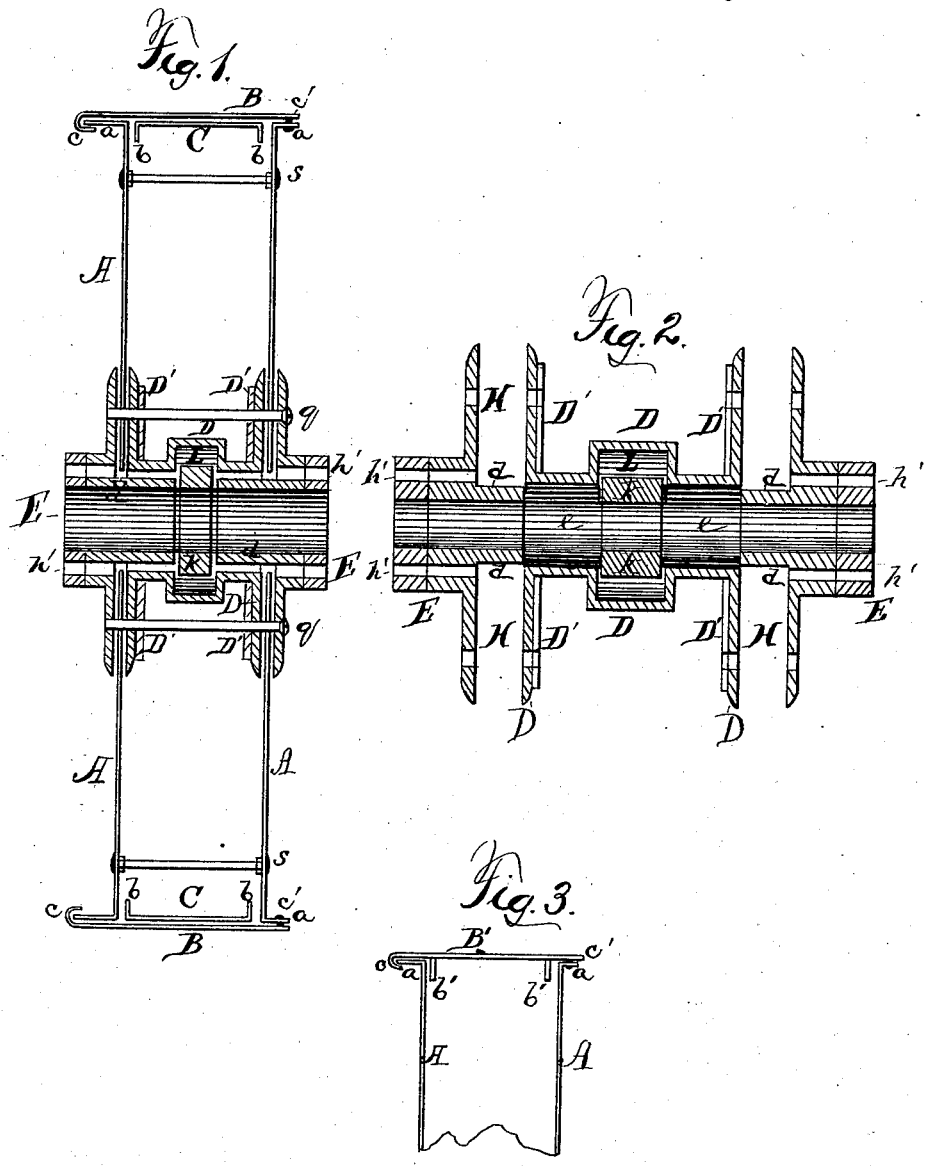

E. E. JOSEF.
WHEEL.

No. 277,904. Patented May 22, 1883.

Witnesses:
T. K. Parson
J. R. Drake

E. E. Josef,
Inventor, by
J. R. Drake,
Atty.

UNITED STATES PATENT OFFICE.

EDWARD E. JOSEF, OF BUFFALO, NEW YORK.

WHEEL.

SPECIFICATION forming part of Letters Patent No. 277,904, dated May 22, 1883.

Application filed October 14, 1882. (No model.)

*To all whom it may concern:*

Be it known that I, EDWARD E. JOSEF, a citizen of the United States, residing at Buffalo, in the county of Erie and State of New York, have invented certain new and useful Improvements in Wheels or Pulleys, of which the following is a specification, reference being had therein to the accompanying drawings.

This invention relates to improvements in the construction of whole or sectional pulleys and wheels for mechanical or vehicular purposes; and the invention consists in their construction, as fully hereinafter explained and specified.

Figure 4:
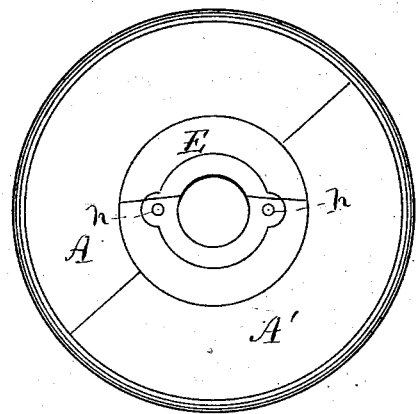
Figure 5:
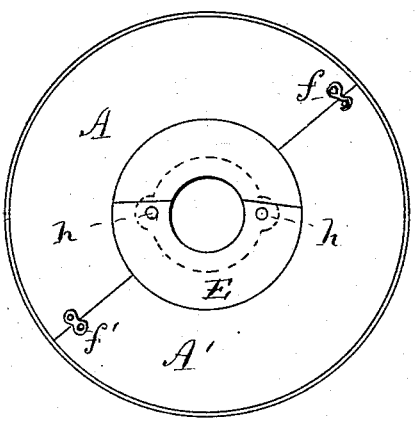
Figure 6:
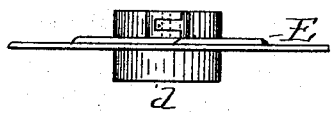

In the drawings, Figure 1 is a vertical central cross-section through the entire device; Fig. 2, a somewhat enlarged cross-section through the central connecting-piece and hubs of the wheels or pulleys; Fig. 3, a detail of a variation in construction of the tire or band; Fig. 4, a plan or elevation of the sectional hub in connection with the disk of the wheel, outside view; Fig. 5, an inside view of same; Fig. 6, a side elevation of flanged hub.

A A represent the two disks, forming the sides of the wheel or pulley, made flat from sheet metal, steel, or iron, either stamped or spun, being specially adapted for this purpose. These each have a flange, $a$, projecting out from the edge, as shown in Figs. 1 and 2, for stiffening and strength, also to attach the tire or band B thereto, which is done by either bending over the edge of the tire, as at $c$, or else riveted together, as at $c'$, or other suitable means.

The hub or base of the wheel is formed as follows: A central connecting-piece, D, constructed like a thread-spool, forms the center, and in each end of this is set a hub, E, having a projecting inner flange, $d$, which sets into the annular space $e$ in the connection D. (See Figs. 1, 2, and 6.)

Into the spaces shown at H H, Fig. 2, between the hubs and the connection D, the flanged disks A A are set, as shown in Fig. 1, and the whole are bolted together with four countersunk oval-headed bolts, $q\ q$, and the disks bolted together at $s\ s$, as shown in Fig. 1.

For sectional loose pulleys and wheels the disks are made in two pieces or halves, A and A', (see Figs. 4 and 5,) the object being to allow them to be put on or taken off of shafts without taking the shaft down or interfering with the running of the rest of the machinery. These halves A and A' are fastened on the inside by hooks $f$ or links $f'$ and bolts. (See Fig. 5.) The central connection, D, is also made in two pieces and fastened together by dovetailing, hinging, or overlapping, (the latter method indicated by letters D' D', Figs. 1 and 2.) The flanged hubs E are also made in halves with interlocking sections, (more particularly shown in Fig. 6,) and with pins $h\ h$ to secure them, (the pin-holes shown in Figs. 1 and 2 at $h'\ h'$.) The whole device is united by bolts $q$ and $s$, as in the whole wheels and pulleys.

To keep the disks A A apart and in place, and also to stiffen and strengthen them, I set inside the disks and close to the tire or band B a supporting-ring, C, having flanges $b\ b$ turned back from its edge, (see Fig. 1;) or the tire and separating-ring can be made in one, as shown in Fig. 3, by rolling or crimping the flanges $b'\ b'$ on the inner surface of the tire B', thus forming the periphery of the wheel as well as the strengthening-flanges $b'\ b'$ in one. Over this may be set a second band, if desired.

To lubricate the loose pulleys and wheels, I construct or cast in the central connection, D, a raised annular space, L, Figs. 1 and 2, and set therein in contact with the shaft a ring or band of felt or other suitable material, K. Into this space L the lubricant is poured, which saturates the ring K. This acts like a wick to a lamp, and will keep the shaft or bearing lubricated a long time.

This whole construction gives a light, true-running, strong, closed wheel or pulley, causes less friction, does not churn the air like open pulleys, and takes less power to run it. The sectional ones are of special value and advantage in putting on (or taking off) shafting.

I claim—

1. In a wheel or pulley, the combination of the disks A A, having the outer flanges, $a\ a$, the central connection, D, and hubs E E, and flanged supporting-ring C $b\ b$, either or all made in sections or whole, and with the tire or band B, fastened to the flanged disks A A $a\ a$ by bolts $c'$, or bent over at $c$, the whole wheel united by countersunk and oval-headed bolts $q\ q$ and bolts $s\ s$, substantially as and for the purposes specified.

2. In a wheel or pulley, the combination, with the flanged disks A A, of tire or band B', having the inside disk-supporting flanges, $b'\ b'$, formed, rolled, or crimped thereon, substantially as and for the purpose specified.

3. In a wheel or pulley, the combination of the central connection, D, with the raised annular oil-space L, cast or formed therein, and with the felt ring K or its equivalent therein, substantially as and for the purpose specified.

In testimony whereof I affix my signature in presence of two witnesses.

EDWARD E. JOSEF.

Witnesses:
J. R. DRAKE,
T. H. PARSONS.